US 8,861,657 B2

(12) United States Patent
Nilsson et al.

(10) Patent No.: US 8,861,657 B2
(45) Date of Patent: Oct. 14, 2014

(54) FREQUENCY OFFSET COMPENSATION FOR MULTI-CARRIER COMMUNICATION SYSTEMS

(75) Inventors: Thomas Nilsson, Malmö (SE); Amit Singh, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 58 days.

(21) Appl. No.: 13/695,885

(22) PCT Filed: May 6, 2011

(86) PCT No.: PCT/EP2011/057288
§ 371 (c)(1),
(2), (4) Date: Nov. 21, 2012

(87) PCT Pub. No.: WO2011/138428
PCT Pub. Date: Nov. 10, 2011

(65) Prior Publication Data
US 2013/0202069 A1  Aug. 8, 2013

Related U.S. Application Data

(60) Provisional application No. 61/333,951, filed on May 12, 2010.

(30) Foreign Application Priority Data

May 7, 2010 (EP) .................................. 10004885

(51) Int. Cl.
H03D 1/00 (2006.01)
H04L 27/26 (2006.01)

(52) U.S. Cl.
CPC ........ *H04L 27/2647* (2013.01); *H04L 27/2695* (2013.01); *H04L 27/2675* (2013.01); *H04L 27/2657* (2013.01); *H04L 27/2672* (2013.01)
USPC ........... 375/343; 370/320; 370/335; 708/300

(58) Field of Classification Search
CPC ...................................... H04B 3/232
USPC ..................................... 375/343
See application file for complete search history.

(56) References Cited

U.S. PATENT DOCUMENTS

2006/0193392 A1* 8/2006 Kim et al. ...................... 375/260
2006/0233270 A1* 10/2006 Ahn et al. ...................... 375/260
(Continued)

OTHER PUBLICATIONS

Smida et al, "A Spectrum-Efficient Multicarrier CDMA Array-Receiver with Diversity-Based Enhanced Time and Frequency Synchronization," IEEE Transactions n Wireless Communications. vol. 6 No. 6, Jun. 2007, pp. 2315-2327.
(Continued)

*Primary Examiner* — Chieh Fan
*Assistant Examiner* — Santiago Garcia
(74) *Attorney, Agent, or Firm* — Murphy, Bilak & Homiller, PLLC

(57) ABSTRACT

The present disclosure provides a frequency offset compensation technique for use by a multi-carrier receiver. Compared with legacy receiver designs, the technique introduces a new function which correlates various frequency offsets of the different carriers involved in multi-carrier signal transmission and reception. This new function can be coupled with an Automatic Frequency Control (AFC) function which can then utilize the correlation information provided by the new function to achieve significantly better frequency error/offset estimation when the carriers are correlated. As a method aspect, the frequency offset compensation technique comprises the steps of receiving signals modulated on a plurality of carrier frequencies, deriving a frequency offset for each carrier frequency to thereby provide a plurality of frequency offsets corresponding to the plurality of carrier frequencies; correlating these plurality of frequency offsets; and controlling compensation of the frequency offsets based on a result of the correlation.

22 Claims, 5 Drawing Sheets

(56) References Cited

U.S. PATENT DOCUMENTS

| | | | |
|---|---|---|---|
| 2006/0291550 A1* | 12/2006 | Wang et al. | 375/229 |
| 2007/0060091 A1* | 3/2007 | Kim et al. | 455/266 |
| 2007/0160121 A1* | 7/2007 | Abraham et al. | 375/150 |
| 2008/0112469 A1* | 5/2008 | Goldberg et al. | 375/150 |
| 2008/0158050 A1* | 7/2008 | Levy | 342/357.02 |
| 2008/0205492 A1* | 8/2008 | Gorday et al. | 375/150 |
| 2009/0135977 A1* | 5/2009 | Sheu | 375/371 |
| 2009/0258628 A1 | 10/2009 | Lindoff et al. | |
| 2009/0310653 A1* | 12/2009 | Gorday | 375/149 |
| 2009/0312056 A1 | 12/2009 | Drugge et al. | |
| 2010/0035568 A1* | 2/2010 | Ghosh | 455/192.1 |
| 2011/0013708 A1* | 1/2011 | Hedayat et al. | 375/260 |

OTHER PUBLICATIONS

Third Generation Partnership Project, "3GPP TS 25.212 V8.5.0 (Mar. 2009)," 3rd Generation Partnership Project; Technical Specification Group Radio Access Network; Multiplexing and channel coding (FDD) (Release 8). Mar. 2009. pp. 1-106.

* cited by examiner

FREQUENCY OFFSET COMPENSATION FOR MULTI-CARRIER COMMUNICATION SYSTEMS

TECHNICAL FIELD

The present invention generally relates to wireless communication systems. In particular, the invention is directed to a frequency offset compensation technique for multi-carrier communication systems.

BACKGROUND

Universal Mobile Telecommunication System (UMTS) is a widely used wireless communication system nowadays. In UMTS, like in any other wireless system, frequency errors, or offsets, between the transmitter (e.g. a base station) and receiver (e.g. a user terminal) can be introduced in the transmitter and due to Doppler shift in the wireless channel. Such frequency offsets can lead to a communication performance degradation at the receiver, such as an increase in bit-error rate and a decrease in throughput. It is thus desired that these frequency offsets be compensated, e.g., reduced to the minimum, at the receiver in order to achieve best performance.

Developers and operators of wireless communication systems are under the constant pressure of providing an ever-increasing data rate, although radio spectrum is a limited resource. A solution to this need is the High-Speed Downlink Packet Access (HSDPA) protocol, which allows legacy UMTS networks to offer higher data transfer speeds and capacity. HSDPA in legacy UMTS systems is based on single cell, or single carrier, operation. The frequency offset between a transmitter and a receiver is thus compensated at the receiver for single carrier operation.

To achieve even higher data rates, the 3GPP standard body has approved the Dual Cell (or Dual Carrier) High Speed Downlink Packet Access (DC-HSDPA) protocol, which can improve the bit rate in terms of peak rate and average bit rate from the perspective of the user terminal. In DC-HSDPA, data targeted for a particular receiver is modulated onto two distinct HSDPA carriers at different frequencies and then transmitted together to the receiver.

Dual-Carrier HSDPA is included in Release 8 of 3GPP; other variations such as Dual Band HSDPA and DC-HSUPA are included in Release. 9. HSDPA-specific issues for dual-carrier operation are addressed in the 3GPP document "Technical Specification Group Radio Access Network; Dual-Cell HSDPA Operations", 3GPP, TR 25.825 V. 1.0.0.

Utilization of more than two carriers has also been proposed. Multi-carrier (MC) operation involves jointly scheduling two or more HSDPA carriers to increase the peak data rate per user terminal and increase the utilization of available frequency resources by multiplexing carriers in the CELL DCH state.

In DC- or MC-HSDPA there are two types of carriers: The first carrier type known as the "Anchor carrier" carries all the legacy physical channels including DPCH/F-DPCH, E-HICH, E-RGCH, E-AGCH, PICH, SCCPCH, AICH etc. The other carrier type relates to "supplementary" carriers, which carry a reduced set of physical channels in order to reduce signaling overhead.

According to 3GPP Technical Specification "Universal Mobile Telecommunications System (UMTS); Multiplexing and channel coding (FDD)" 3GPP TS25.212 version 8.5.0 Release 8, the required base-station frequency accuracy for single carrier in a UMTS system is 0.05 parts per million (ppm) for macro base stations. Considering two individual carriers in the case of DC-HSDPA, the relative frequency error at the base station reference points could be up to 0.1 ppm. Currently there is no 3GPP requirement on base station relative frequency error but it can be assumed that a base station which uses the same source for frequency generation can have a relative frequency error lower than 0.1 ppm since the error introduced in the source can be excluded from the final value of the user terminal-relative frequency error.

Frequency offset estimation and compensation at a receiver is normally performed by a so-called Automatic Frequency Control (AFC) function. Because user terminals generally rely on inexpensive oscillators to provide a time and/or frequency reference, they must repeatedly estimate the time and frequency offset between a received signal and an on-board reference signal to correctly and efficiently receive and decode received data. Obviously, this will also be true for multi-carrier extensions of today's wireless communication systems.

SUMMARY

In view of the above developments and requirements, an improved technique is needed to efficiently compensate frequency offsets in a multi-carrier wireless communication system.

To meet the above need, the present invention proposes a frequency offset compensation technique for use by a multi-carrier receiver.

According to a first aspect, a frequency offset compensation method for a multi-carrier receiver is provided. The method comprises the steps of receiving signals modulated on a plurality of carrier frequencies, deriving a frequency offset for each carrier frequency to thereby provide a plurality of frequency offsets corresponding to the plurality of carrier frequencies; correlating the plurality of frequency offsets; and controlling compensation of the frequency offsets based on a result of the correlation.

In deriving the frequency offset for each carrier frequency the following operations may be performed: deriving, based on a set of reference symbols included in the signal received on the respective carrier, a frequency error signal; and accumulating, for the respective carrier, such frequency error signals with respect to at least one set of reference symbols so as to obtain an accumulated frequency error signal. The accumulated frequency error signal may be used in the correlation of the plurality of frequency offsets. As an example, for each carrier, a group of frequency error signals may be formed, wherein the group comprises a plurality of accumulated frequency error signals with respect to a plurality sets of reference symbols. Thereafter, a correlation coefficient between the groups of frequency error signals may be calculated.

The calculated correlation coefficient may contribute to the controlling of the frequency offset compensation. Specifically, controlling compensation of the frequency offsets may include comparing the correlation coefficient with at least one threshold. According to an exemplary implementation, two or more thresholds may be used. For instance, the correlation coefficient may be compared to two thresholds, wherein the first threshold is greater than the second one and wherein the comparison determines whether the correlation coefficient is greater than the first threshold and/or whether the correlation coefficient is less than the second threshold.

One implementation of controlling the compensation of the frequency offsets goes through the following operations: computing a channel estimate for each receiving antenna-carrier-reference symbol combination; computing, with respect to each receiving antenna-carrier combination, at least one phase difference between the channel estimates corresponding to subsequent symbols included in the reference-symbol set; obtaining, for each receiving antenna-carrier combination, an average of the at least one phase difference; summing the averaged phase difference over a plurality of antennas and carriers; deriving a frequency correction value based on the summed average; and compensating the frequency offsets using the frequency correction value derived. The number of the channel estimates used in the computation of phase difference may be changed. The change may be configured to take place dynamically.

In summing the averaged phase difference, different weighting factors may be used for different carriers. For instance, a higher weighting factor may be used for a carrier whose frequency offset has a lower variance or standard deviation. A frequency error with a low variance/standard deviation generally indicates that the reference symbols are not noisy.

Another implementation for controlling the compensation of the frequency offsets includes the following operations: computing a channel estimate for each receiving antenna-carrier-reference symbol combination; computing, with respect to each receiving antenna-carrier combination, phase differences between the subsequent channel estimates corresponding to all the symbols included in the reference-symbol set; summing, for at least one carrier, the phase differences over a plurality of receiving antennas and the symbols in the reference-symbol set, to thereby obtain a summed phase difference; deriving, for the at least one carrier, a frequency correction value based on the summed phase difference; obtaining a weighted average of the frequency correction values corresponding to the plurality of carriers; and compensating the frequency offsets using the average frequency correction value obtained.

In a similar manner as for the first implementation above, different weighting factors for different carriers may be used in obtaining the weighted average. The values of the different weighting factors may depend on signal strengths or signal-to-interference (SIR) ratios of the different carriers.

According to a second aspect, the frequency offset compensation technique is achieved by a computer program product. The computer program product comprises program code portions for performing the frequency offset compensation method as well as its various implementations when the computer program product is executed on a computing device. The computing device may be a user terminal, or a base station, but it is not limited to these entities. The computer program product may be stored on a computer-readable recording medium.

According to a third aspect, an apparatus for frequency error compensation is provided for a multi-carrier receiver. The apparatus comprises the following components: a receiving unit configured to receive signals modulated on a plurality of carrier frequencies; a derivation unit configured to derive a frequency offset for each carrier frequency; a correlator configured to correlate the plurality of frequency offsets derived corresponding to the plurality of carrier frequencies; and a controller configured to control compensation of the frequency offsets based on a result of the correlation.

The derivation unit may be further adapted to derive, based on a set of reference symbols included in the signal received on the respective carrier, a frequency error signal, and to accumulate, for the respective carrier, such frequency error signal/signals with respect to at least one set of reference symbols to thereby obtain an accumulated frequency error signal. Moreover, the correlator may be further adapted to form a group of frequency error signals for each carrier which group comprises a plurality of accumulated frequency error signals with respect to a plurality set of reference symbols. The correlation may further calculate a correlation coefficient between the groups of frequency error signals. The apparatus may also comprise a comparator adapted to compare the correlation coefficient with at least one threshold.

The apparatus may further comprise a frequency corrector adapted to, among others, derive a frequency correction value for compensating the frequency offsets. In this regard, different implementations of the frequency corrector are possible. In one implementation, the frequency corrector is adapted to perform the following operations: compute a channel estimate for each receiving antenna-carrier-reference symbol combination; compute, with respect to each receiving antenna-carrier combination, at least one phase difference between the channel estimate corresponding to subsequent symbols included in the reference-symbol set; obtain, for each receiving antenna-carrier combination, and average of the at least one phase difference; sum the averaged phase difference over a plurality of antennas and carriers; derive a frequency correction value based on the summed average; and compensate the frequency offset using the frequency correction value derived.

In another implementation, the frequency corrector may be adapted to operate as follows: compute a channel estimate for each receiving antenna-carrier-reference symbol combination; compute, with respect to each receiving antenna-carrier combination, phase differences between the subsequent channel estimates corresponding to all the symbols included in the reference-symbol set; sum, for at least one carrier, the phase differences over a plurality of receiving antennas and the symbols in the reference-symbol set to thereby obtain a summed phase difference; derive, for the at least one carrier, a frequency correction value based on the summed phase difference; obtain a weighted average of the frequency correction values corresponding to the plurality of carriers; and compensate the frequency offsets using the average frequency correction value obtained.

The above two implementations may be embodied within one frequency corrector or separately.

According to a another aspect, there is provided a multi-carrier signal receiver comprising the apparatus discussed above. Also provided is a user terminal which comprises either the apparatus or the multi-carrier signal receiver presented herein. Still further, a base station is provided which comprises either the apparatus or the multi-carrier signal receiver presented herein.

BRIEF DESCRIPTION OF THE DRAWINGS

In the following, the invention is further described with reference to exemplary embodiments illustrated in the figures, in which.

DETAILED DESCRIPTION

In the following, for purposes of explanation and not limitation, specific details such as particular communication standards are set forth in order to provide a thorough understanding of the present invention. It will be apparent to those skilled in the art that the invention may be practiced in embodiments that depart from these specific details.

Those skilled in the art will further appreciate that one or more of the various functions explained herein below may be implemented using processing circuits comprising hardware, software, or any combination thereof. The software may be provided in conjunction with a programmed microprocessor or a general purpose computer, using an Application Specific Integrated Orcuit (ASIC) and/or Digital Signal Processors (DSPs). It will also be appreciated that when the present invention is described as a method, it may also be embodied in a computer processor and a memory coupled to the processor, wherein the memory is encoded with one or more programs that perform the method when executed by the processor.

Generally, Automatic Frequency Correction (AFC) as presented herein comprises two functional components: estimation of frequency error/offset and correction/compensation thereof. In a basic AFC implementation, frequency offset estimation can be performed by comparing the signal received by a receiver with a set of reference symbols, e.g., Common Pilot Channel (CPICH) pilot symbols, obtained by the receiver; the estimated frequency error may be represented as a rotation of the recovered pilot symbols in the IQ plane over time.

Between a transmitter and the receiver, the phase of a transmitted signal may undergo distortion due to frequency drift, channel propagation, etc. The phase distortion can be measured as a channel estimate by using the pilot symbols as follows:

$$\hat{y} = \vec{s}_{curr} * (\vec{s}_{prev})^*,$$

where $\vec{s}_{curr}$ and $\vec{s}_{prev}$ are a current and a previous pilot symbol and $(\vec{s}_{prev})^*$ is the complex conjugate of $\vec{s}_{prev}$.

The frequency error, or offset, $\Delta f$, can then be determined via the phase of the channel estimate by the following relation:

$$2\pi \Delta f T_0 = \arctan\left(\frac{\text{Im}(\hat{y})}{\text{Re}(\hat{y})}\right),$$

where $T_0$ is the sampling period.

Figure 1:
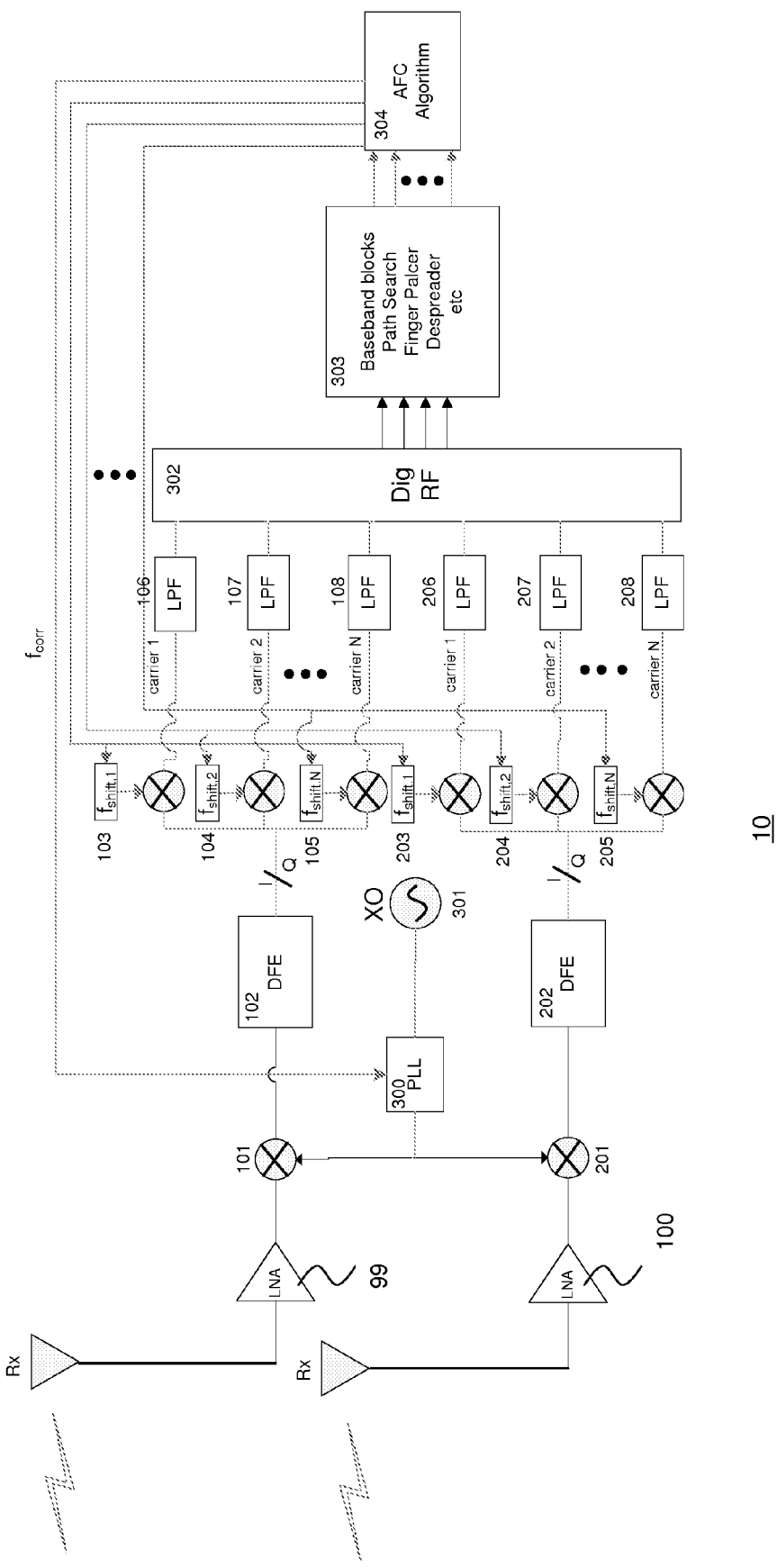
FIG. 1 is a block diagram showing a baseline multi-carrier receiver comprising an Automatic Frequency Control function for frequency offset compensation in which the frequency offset compensation technique presented herein can be implemented.

FIG. 1 presents a baseline multi-carrier receiver for the case of N carriers and using one local oscillator as well as two receiver paths. As illustrated, the N carriers are received with two antennas and amplified by associated Low Noise Amplifiers (LNAs) 99, 100. The amplified signals are down-converted to the baseband frequency using mixers 101, 201, Phase Locked Loop (PLL) 300 and analog oscillator 301, so that DC falls precisely in between the N received carriers. In one embodiment of a Dual Carrier system with two carriers $f_1$ and $f_2$, the frequency of the analog oscillator 301 may be set to $(f_1+f_2)/2$ so that the DC falls between the two received carrier frequencies $f_1$ and $f_2$. The two received signals are then passed through a respective Digital Front End (DFE) 102, 202 which performs, inter alia, analog to digital conversion, low pass filtering, and automatic gain control operations. The carriers are separated after leaving the DFE.

Thereafter, the carriers are down-converted to zero frequency using functional blocks 103, 104, 105, 203, 204, and 205 comprising mixers and frequency shifters. In the embodiment of the two-carrier system mentioned above, $f_{shift,1}=(f_1-f_2)/2$ and $f_{shift,2}=-(f_1-f_2)/2$. The functional blocks 103, 104, 105, 203, 204, and 205 include nominal carrier frequency offsets, which may be spaced by 5 MHz apart, or by any other value compliant with the applicable channel raster. Once the carrier of interest has been down-converted to the zero frequency, the adjacent unwanted carrier is removed using a subsequent low-pass filter represented by functional blocks 106, 107, 108, 206, 207 and 208. The output is then passed to baseband processor blocks 303 through a Digital Radio Frequency (Dig RF) interface 302.

In regular intervals, e.g., once per slot, block 303 also outputs a set of received and de-spread known reference symbols $S_{ref}$. The set $S_{ref}$ comprises $N_{ref}$ symbols. $S_{ref}$ can, e.g., be a set of Common Pilot Channel (CPICH) pilot symbols $g_i^{c,a}$, where i denotes the pilot symbol number from 1 to $N_{ref}$, c denotes carrier number, and a denotes receiver antenna number. The pilot symbols are fed into an Automatic Frequency Control block 304 for further processing.

AFC 304 analyses the received pilot symbols and produces a frequency correction control command to adjust the PLL at block 300 and reduce the frequency offset between the transmitted and received frequencies. AFC 304 may additionally generate some digital oscillator signals to reduce frequency offsets between the carriers.

The generation of the frequency correction control command by the AFC 304 is performed as follows:

1. Produce channel estimates $h_i^{c,a}$, where c denotes carrier number, a denotes receiving antenna and i denotes the index of the received pilot symbol within a set of reference symbols $S_{ref}$ being processed, according to $$h_i^{c,a} = g_i^{c,a}(p_i^c)^* \quad (1)$$

where $p_i^c$ denotes the transmitted (known) pilots and * denotes the complex conjugate.

2. For i=0, 1, ..., $N_{ref}$-1, calculate a phase difference, or phase delta, according to $$\Delta h_i^{c,a} = h_{i+1}^{c,a} \cdot (h_i^{c,a})^* \quad (2)$$

where $h_0^{c,a}$ is the last channel estimate from the previous set of reference symbols.

3. Filter the phase delta values obtained in the previous step, e.g., in accordance with $$y_c = \Sigma_{a=1}^A \Sigma_{i=0}^{N_{ref}-1} \Delta h_i^{c,a} \quad (3)$$

Although not explicitly indicated in Equation (3), certain wireless communication receivers, such as WCDMA receivers, may employ de-spreaders, so called "fingers", at different time delays, The number of employed fingers may usually be adjusted to match the propagation channel. If more than one finger is employed, one can filter $y_c$ also over the fingers, and Equation (3) would become $$y_c = \sum_{a=1}^{A} \sum_{f=1}^{F_{c,a}} \sum_{i=0}^{N_{ref}-1} \Delta h_{i,f}^{c,a} \quad (3a)$$

where $\Delta h_{i,f}^{c,a}$ denotes phase delta values attained as in step 2, but apart from having one value per carrier, receiver antenna and pilot symbol per set of received reference symbols $S_{ref}$ comprising $N_{ref}$ symbols, one also has one value per finger, f. Fc,a denotes the set of all fingers from carrier c and antenna a, and A denotes the number of employed antennas. $y_c$ may be filtered if desired.

4. Then compute an angle, based on $y_c$, as $$\varphi_c = \frac{1}{2\pi} \arctan \frac{\text{Im}(y_c)}{\text{Re}(y_c)}. \qquad (4)$$

5. The frequency error can be computed as, $$2\pi \varphi_c = 2\pi \cdot \Delta t \cdot f_{err,c} \Rightarrow f_{err,c} = \frac{1}{\Delta t} \cdot \varphi \, \text{Hz} \qquad (5)$$

where $\Delta t$ is the time between two subsequent calculations of $\phi_c$

6. Form the control signal for the PLL (block 300) using a linear average of the individual frequency errors, $$PLL_{cntrl} = -\frac{1}{N_c} \sum_C f_{err,c} \qquad (6)$$

where $N_c$ is the number of carriers.

7. Calculate the residual frequency error on each carrier as $$f_{err,residual,c} = f_{err,c} + PLL_{cntrl} \qquad (7)$$

8. The control signals for the digital oscillators (blocks 103, 104, 105, 203, 204, 205) can be given as:

$$DO_{cntrl,c} = -f_{err,residual,c} \qquad (8).$$

9. Provide the $PLL_{cntrl}$ signal to the PLL (block 300), $DO_{cntrl,1}$ to the digital oscillators corresponding to carrier 1 (blocks 103 and 203), and $DO_{cntrl,c}$ to the digital oscillators corresponding to carrier c (blocks 105 and 205).

The AFC performance may directly impact the receiver performance (e.g. measured in terms of maximum throughput). Hence, any improvement to the AFC function may lead to system-wide improvements. It is common that the different carrier signals are generated by using the same oscillator at the transmitter side, e.g., a base station or a Node B. Since it is expected that, to minimize costs, network operators will use a common frequency source for more and more base stations or Node Bs to generate multiple carrier signals, the frequency offsets in the carriers will be highly correlated. The frequency offset compensation techniques presently known are not able to exploit this correlation information to increase system performance.

In addition, the frequency offset compensation techniques presently known are not able to recognize that the estimation of frequency offset may be better on one carrier than on another. In a two-carrier system, if one carrier has a good frequency offset estimate while another has a poor one, the present techniques may thus render a sub-optimal estimate which is worse than the estimate if only one carrier was used.

To better compensate frequency offsets in a multi-carrier wireless communication system, an improved frequency offset compensation technique is provided. Compared with legacy receiver designs, the technique introduces to the receiver a new function which correlates various frequency offsets of the different carriers used in the multi-carrier transmission and reception. This new function can be coupled with an AFC on which improved AFC algorithms are implemented. The improved AFC algorithms can utilize the correlation information provided by the new function to thereby achieve significantly better frequency offset estimation when the carriers are correlated.

Figure 2:
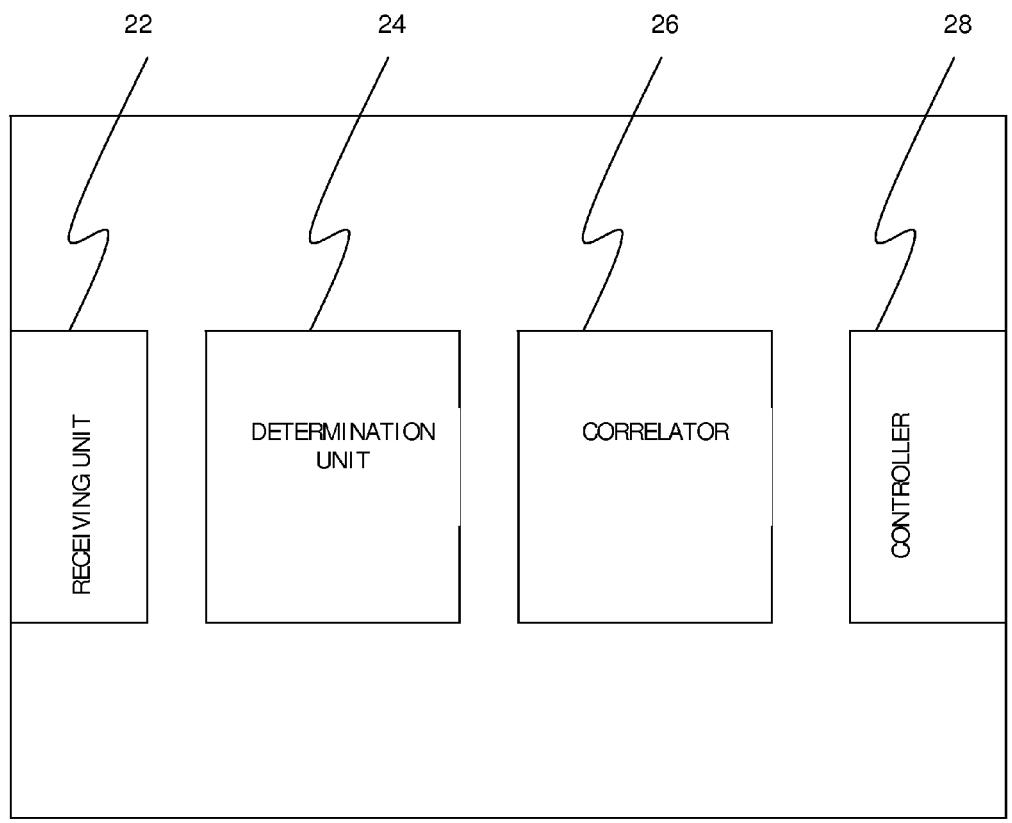
FIG. 2 is a block diagram showing an apparatus embodiment of the frequency offset compensation technique presented herein.

FIG. 2 illustrates an apparatus embodiment 20 of an improved frequency offset compensation technique for use by a multi-carrier receiver. The apparatus 20 can be implemented in the receiver illustrated in FIG. 1.

As shown in FIG. 2, the apparatus 20 mainly comprises four components, a receiving unit 22, a derivation unit 24, a correlator 26, and a controller 28. The receiving unit 22 is configured to receive signals, including multi-carrier signals, i.e., signals modulated on a plurality of carrier frequencies. The derivation unit 24 is configured to derive a frequency offset for each carrier frequency; hence for the plurality of carrier frequencies over which the multi-carrier signals are modulated and transmitted, the derivation unit 24 can derive a plurality of frequency offsets respectively. The correlator 26 is configured to correlate the plurality of frequency offsets derived corresponding to the plurality of carrier frequencies. The controller 28 is configured to control compensation of the frequency offsets based on a result of the correlation.

Figure 3:
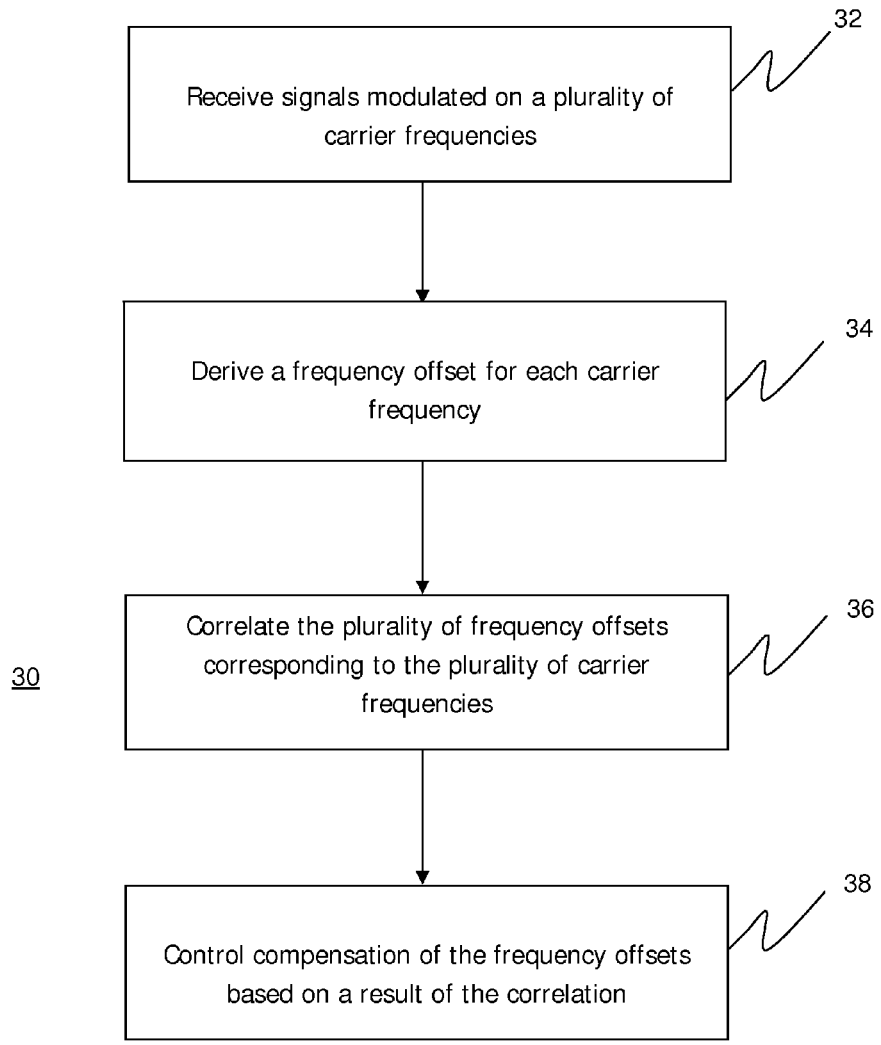
FIG. 3 is a flow chart showing a method embodiment of the frequency offset compensation technique.

Referring to FIG. 3, a method embodiment 30 of an improved frequency offset compensation technique for a multi-carrier receiver is provided. The apparatus embodiment 20 shown in FIG. 2, as well as any implementation thereof, can be configured to perform the method 30 or its variants.

As shown in FIG. 3, the frequency offset compensation method 30 begins with step 32, where signals modulated on a plurality of carrier frequencies are received, e.g., by a multi-carrier receiver. Then at step 34, a frequency offset for each carrier frequency is derived; hence a plurality of frequency offsets corresponding to the plurality of carrier frequencies is derived. Next at step 36, the plurality of frequency offsets are correlated, in order to output a correlation result. Lastly, based on the result of the correlation, compensation of the frequency offsets is controlled accordingly.

Below, a more through explanation of the frequency offset compensation technique is provided with reference to FIG. 4, which shows another apparatus embodiment 40.

Some components and functions of the apparatus 40 are similar to their counterparts comprised in apparatus 10 shown in FIG. 1 as can be seen from their reference numerals in commons. For conciseness, the functional details of the similar components are not repeated here. However, compared with the apparatus embodiment 10, apparatus 40 additionally comprises a correlation unit 306, which is shown to be coupled with the AFC Algorithm 304.

Figure 5:
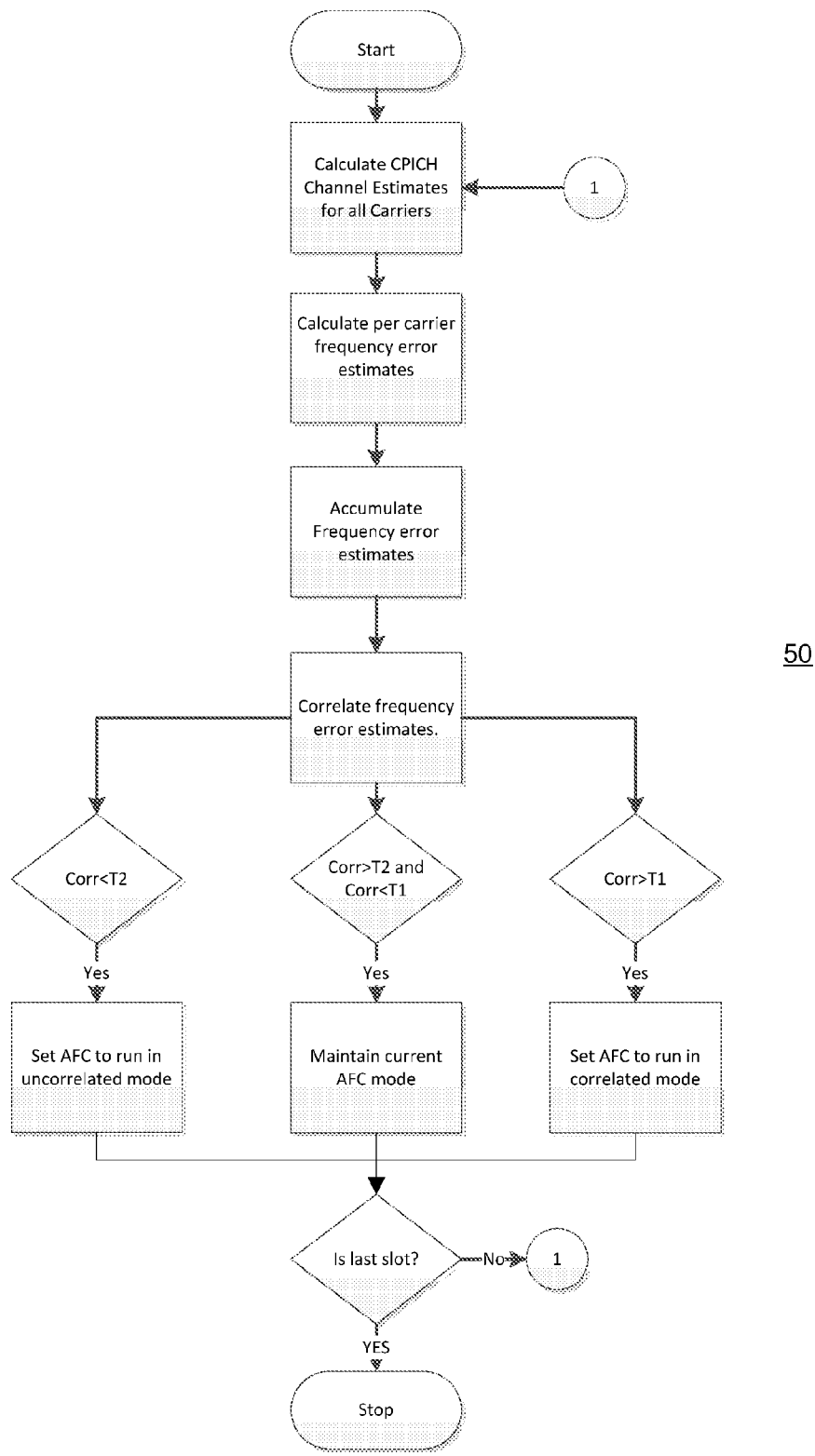
FIG. 5 is a flow chart showing another method embodiment of the frequency offset compensation technique.

In essence, the correlation unit 306 serves to determine if two or more carriers have correlated frequency offsets. The output from the correlation unit 306 is fed into the AFC block 304 to, among others, control the selection of an appropriate AFC algorithm and/or the switching between AFC algorithms. In some implementations, the correlation unit 306 may comprise a hysteresis loop to ensure stability in the switching of AFC algorithms (as can be seen from FIG. 5). It should be recognized that the correlation between the frequency offsets of the two or more carriers may additionally depend on channel conditions, particularly the coherence bandwidth. To address this further issue, the correlation unit 306 may be designed to effect a dynamic switching of AFC algorithms.

To utilize the correlation information output by the correlation unit 306, new/modified AFC algorithms are now proposed. Examples of the correlation unit 306 and the new/modified AFC algorithms are presented below. Although the examples are directed to two carriers it should be recognized that they can be easily scaled to more than two carriers.

More details concerning the operations of the correlation unit are discussed below with reference to both FIG. 3 and FIG. 4. Referring to step 34 shown in FIG. 3, a frequency offset for each carrier frequency is to be derived. To do so, a frequency error signal is derived based on a set of reference symbols included in the signal received on the respective carrier. For the respective carrier, such frequency error signals/signals are then accumulated with respect to at least one set of reference symbols so as to obtain an accumulated frequency error signal.

Figure 4:
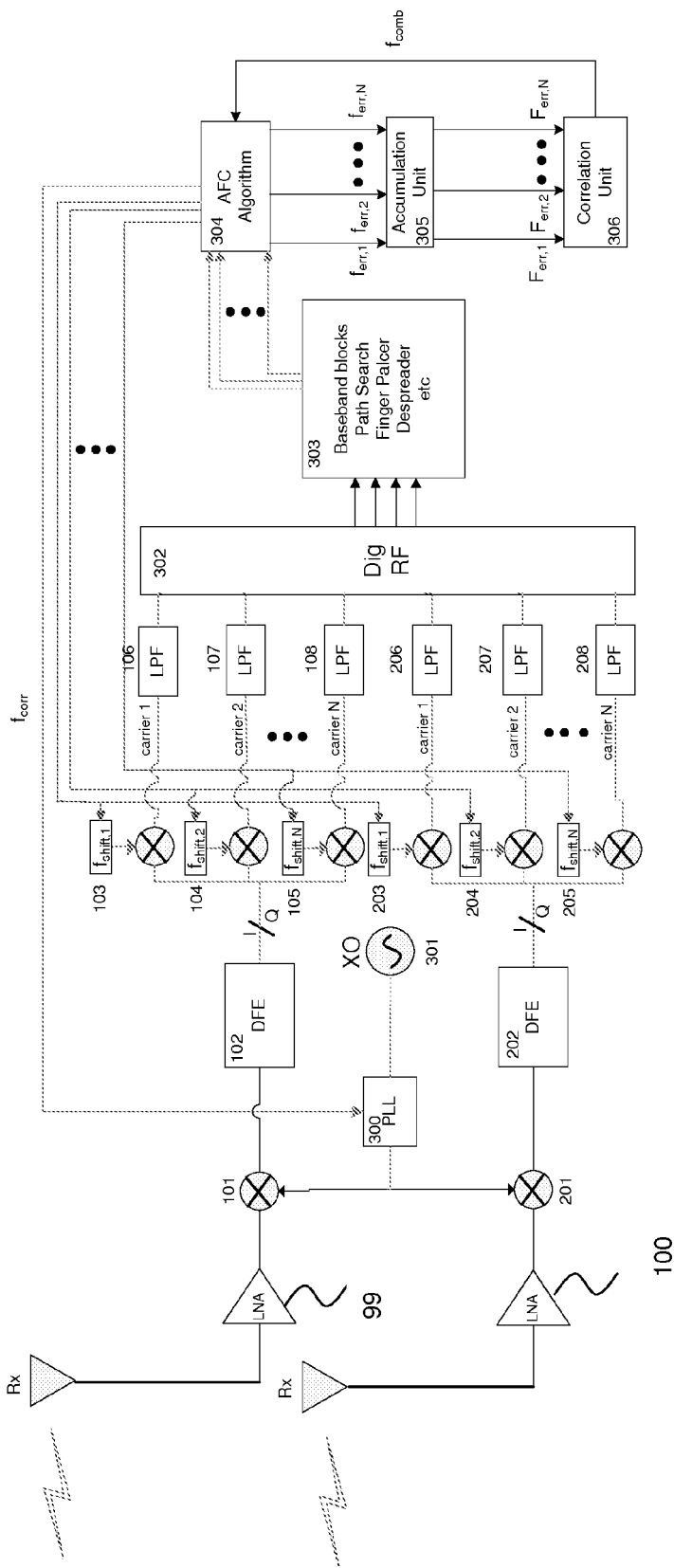
FIG. 4 is a block diagram showing another apparatus embodiment of the frequency offset compensation technique.

The above operations may be performed by a unit within the apparatus 40, a so-called "accumulation unit" shown at 305 in FIG. 4. For clarity purposes the accumulation unit 305 is presented in FIG. 4 as an individual unit separate from the correlation unit 306. However, in terms of functionality the accumulation unit 305 may be viewed as a part of the correlation unit 306; hence, the accumulation unit 305 can also be physically incorporated with the correlation unit 306. In a specific implementation, the accumulation unit 305 calculates a frequency error, e.g., the absolute frequency error, by accumulating the frequency error signals as will now be discussed in more detail.

The absolute frequency errors for carrier 1 and 2 until k sets of reference symbols $S_{ref}$ have been received are given by:

$$F_{err,1,k} = \sum_{i=0}^{k} f_{err,1,i}, \quad (9)$$

$$F_{err,2,k} = \sum_{i=0}^{k} f_{err,2,i} \quad (10)$$

where $F_{err,1,k}$ and $F_{err,2,k}$ stand for the absolute frequency error signals on carrier 1 and carrier 2, respectively.

The accumulated frequency error signal/signals are then used in the correlating of the plurality of frequency offsets. For each carrier, a group of frequency error signals is formed wherein the group comprises a plurality of accumulated frequency error signals with respect to a plurality sets of reference symbols. Thereafter, a correlation coefficient between the groups of frequency error signals is calculated. These operations are performed by the correlation unit 306.

In a specific implementation, the correlation unit 306 stores the last L accumulated frequency error signals for all carriers by the accumulation unit 305. In the case of two carriers, the correlation unit 306 performs the following exemplary procedures (it should be noted that other metrics to measure correlation can also be used):

Let X and Y denote the groups of all frequency errors, for two different carriers, from reference symbol set k to reference symbol set k+L−1, and let $\rho_{X,Y}$ be the correlation coefficient between X and Y. The correlation unit 306 then calculates the following:

$$X = \{F_{err,1,k}, F_{err,1,k+1}, \ldots, F_{err,1,k+L-1}\}, \quad (11)$$

$$Y = \{F_{err,2,k}, F_{err,2,k+1}, \ldots, F_{err,2,k+L-1}\}, \quad (12)$$

$$\rho_{X,Y} = \frac{E[(X-\mu_X)(Y-\mu_Y)]}{\sigma_X \sigma_Y}, \quad (13)$$

where
$\mu_X = E(X)$,
$\mu_Y = E(Y)$,
$\sigma_X = \sqrt{E[(X-\mu_X)^2]}$,
$\sigma_Y = \sqrt{E[(X-\mu_Y)^2]}$.
where
$E(\bullet)$ is the expectation operation.

The correlation coefficient $\rho_{X,Y}$ as calculated above may contribute to the controlling of the frequency offset compensation. Specifically, controlling compensation of the frequency offsets may include comparing the correlation coefficient with at least one threshold. According to a certain implementation, two or more thresholds may be used. For instance, the correlation coefficient may be compared to two thresholds, wherein the first threshold is greater than the second one and the comparison determines whether the correlation coefficient is greater than the first threshold and/or whether the correlation coefficient is less than the second threshold.

The actual frequency offset compensation and the controlling thereof are performed by the AFC block 304. In the case in which two thresholds are defined, controlling of the frequency offset compensation can start with a selection/switching of appropriate AFC algorithms by comparing the correlation coefficient with the two thresholds, as illustrated in the method example shown in FIG. 5:

If $\rho_{X,Y} > \tau_1$, select the correlated mode of AFC algorithm or switch AFC algorithm to correlated mode;

if $\rho_{X,Y} < \tau_2$, select the uncorrelated mode of AFC algorithm or switch AFC algorithm to uncorrelated mode;

if $\rho_{X,Y}$ lies between the two thresholds, the AFC algorithm currently in use in maintained.

Having such two thresholds, wherein $\tau_1 > \tau_2$, adds hysteresis and ensures algorithm switching stability.

If the correlated mode is selected, the AFC block 304 performs the following procedures ("new AFC algorithm") for controlling the compensation of the frequency offsets: computing a channel estimate for each receiving antenna-carrier-reference symbol combination; computing, with respect to each receiving antenna-carrier combination, at least one phase difference between the channel estimates corresponding to subsequent symbols included in the reference-symbol set; obtaining, for each receiving antenna-carrier combination, an average of the at least one phase difference; summing the averaged phase difference over a plurality of antennas and carriers; deriving a frequency correction value based on the summed average; and compensating the frequency offsets using the frequency correction value derived.

A specific example of the new AFC algorithm for the correlated mode is given below. Although the example is explained with reference to a receiver with de-spreaders, i.e., fingers, deployed, it should be recognized the new AFC algorithm can be adapted to be used for or in receivers without fingers.

1. Let $h_{a,f,c}^{i-1}$ and $h_{a,f,c}^{i}$ be the previous and current reference symbol which can be a CPICH channel estimate or DPCH channel sample for antenna a, finger f and carrier c. Then the channel samples are computed as follows $$h_{a,f,c}^{i} = g_{a,f,c}^{i}(p_c^{i})^*, \quad (14)$$

where $g_{a,f,c}^{i}$ denotes the received symbol, $p_c^{i}$ denotes the known pilot symbol and * denotes the complex conjugate.

2. First the phase deltas are computed for a=1, 2, ... A, f=1, 2, ..., F and c=1, 2, ..., C, using n channel samples, $$\Delta h_{a,f,c}^{i} = h_{a,f,c}^{i-1} \cdot (h_{a,f,c}^{i})^*, \text{ i=m, m+1, ..., m+n} \quad (15)$$

The algorithm uses n consecutive channel estimates to compute one frequency error estimate. It is possible to use the information about the correlation in three ways:

(i) Increase the accuracy of the frequency error estimates keeping the frequency error correction application rate (how often the AFC correction update is applied) constant.

(ii) Increase the frequency error correction application rate while keeping the accuracy of the frequency error estimation constant.

(iii) Improving partly the frequency error estimation accuracy and partly the frequency error correction application rate.

Thus, there is a tradeoff between the frequency error correction application rate and the frequency error estimation accuracy. This tradeoff can dynamically be controlled by changing the value of n.

3. Compute an average using the phase delta samples $$h_{a,f,c}^{avg} = \frac{1}{n}\sum_{i=m}^{n+m} \Delta h_{a,f,c}^{i} \qquad (16)$$

4. Combine and scale over the antennas, fingers and carriers $$y = \sum_{a=1}^{A}\sum_{f=1}^{F}\sum_{c=1}^{C}(s_c h_{a,f,c}^{avg}), \qquad (17)$$

where $s_c$ is a scaling factor for each carrier. This scaling factor can be used to give more weight to the stronger carriers. This scaling can for example be based on the variance or the standard deviation of the frequency error for each carrier (this information is available in the correlation unit). A frequency error with a high variance/standard deviation indicates that the pilot symbols are very noisy.

5. Then compute the scaled angle $$\varphi = \frac{1}{2\pi}\arctan\left(\frac{\text{Im}(y)}{\text{Re}(y)}\right) \qquad (18)$$

6. Compute the frequency error $$2\pi\varphi = 2\pi \cdot \Delta t \cdot f_{err} \qquad (19)$$
$$f_{err} = \frac{1}{\Delta t}\varphi,$$

where $\Delta t$ is the time between two consecutive averaged phase deltas (the result of step 3).

The calculated frequency error is applied directly to the PLL:

$$\text{PLL}_{cntrl} = -f_{err} \qquad (20)$$

All the DO control signals are set to 0:

$$\text{DO}_{cntrl,c} = 0 \qquad (21)$$

If the uncorrelated mode is selected, the AFC block 304 performs the following procedures ("modified AFC algorithm") for controlling the compensation of the frequency offsets: computing a channel estimate for each receiving antenna-carrier-reference symbol combination; computing, with respect to each receiving antenna-carrier combination, phase differences between the subsequent channel estimates corresponding to all the symbols included in the reference-symbol set; summing, for at least one carrier, the phase differences over a plurality of receiving antennas and the symbols in the reference-symbol set, to thereby obtain a summed phase difference; deriving, for the at least one carrier, a frequency correction value based on the summed phase difference; obtaining a weighted average of the frequency correction values corresponding to the plurality of carriers; and compensating the frequency offsets using the average frequency correction value obtained.

In a specific implementation, the modified AFC algorithm for the uncorrelated mode operation is carried out as follows:

Steps 1-5 are the same as the steps 1-5 of the "normal AFC algorithm" as described above.

Step 6 of the "normal AFC algorithm" is modified as:

Form the control signal for the PLL (block 300) using a scaled average of the individual frequency errors, $$\text{PLL}_{cntrl} = -\sum_{C} \alpha_c f_{err,c} \qquad (22)$$

where $\alpha_c$ is carrier dependent scaling factor and $$\sum_{C} \alpha_c = 1.$$

As an example $\alpha_c$ may depend on the signal strength or signal-to-interference (SIR) ratio of the carrier c. For instance, if a carrier has a larger signal strength or SIR ratio, a larger scaling factor can be applied to it.

Steps 7-9 are the same as the steps 7-9 of the "normal AFC algorithm" as described above with reference to FIG. 1.

The frequency offset compensation technique described herein allows efficient implementations of multi-carrier (e.g. DC- or MC-HSDPA) receivers, which can process multi-carrier signals that have a relative frequency offset between the carriers.

The frequency offset compensation technique described herein can also enable efficient implementations of multi-carrier (e.g. DC- or MC-HSDPA) transmitters, by allowing them to operate with a finite but non-zero relative frequency offset between the carriers. The receiver implementing the frequency offset compensation technique may be incorporated in a user equipment of a wireless communication system (such as a mobile terminal, a consumer handset or personal digital assistant, wireless data card for use with a personal computer, etc.) or in a base station.

Those of skill in the art will readily note that, although the frequency offset compensation technique described herein considers the case of two carriers, two transmit antennas, and two receiving antennas, the technique can be applied to other scenarios with any combination of carrier and antenna configurations. Likewise, although the technique described herein considers a receiver with direct down-conversion from radio frequency to baseband, the technique can work with other receiver architectures, such as a low-intermediate frequency (low-IF) receiver. Furthermore, although the technique described herein considers using known reference symbols for the estimation of frequency offsets, other frequency estimation methods, e.g. blind frequency estimation, can be used as well.

While the present invention has been described with reference to the above embodiments, it is to be understood that the description is for illustration purposes only. Accordingly, it is intended that the invention be limited only by the scope of the claims appended hereto.

The invention claimed is:

1. A frequency offset compensation method for a multi-carrier receiver, the method comprising:

receiving signals on each of a plurality of carriers at respective carrier frequencies;
deriving a frequency offset for each carrier frequency;
correlating the plurality of frequency offsets corresponding to the plurality of carrier frequencies; and
controlling compensation of the frequency offsets based on a result of the correlation.

2. The method according to claim 1, wherein deriving the frequency offset for each carrier frequency comprises:
deriving a frequency error signal based on a set of reference symbols included in the signal received on the respective carrier; and
accumulating such frequency error signals for each carrier with respect to one or more sets of the reference symbols received on the carrier, to obtain an accumulated frequency error signal for each carrier.

3. The method according to claim 2, wherein correlating the frequency offsets comprises:
for each carrier, forming a group of the accumulated frequency error signals comprising a plurality of the accumulated frequency error signals obtained with respect to a plurality of the sets of reference symbols received on the carrier; and
calculating a correlation coefficient between the groups of the accumulated frequency error signals.

4. The method according to claim 3, wherein controlling compensation of the frequency offsets comprises comparing the correlation coefficient with at least one threshold.

5. The method according to claim 4, wherein comparing the correlation coefficient comprises determining at least one of:
whether the correlation coefficient is greater than a first threshold; and
whether the correlation coefficient is less than a second threshold, wherein the first threshold is greater than the second threshold.

6. The method according to claim 5, wherein controlling compensation of the frequency offsets further comprises:
computing a channel estimate for each receiving antenna-carrier-reference symbol combination;
computing, with respect to each receiving antenna-carrier combination, at least one phase difference between the channel estimates corresponding to subsequent reference symbols included in the set of reference symbols;
obtaining, for each receiving antenna-carrier combination, an average of the at least one phase difference;
summing the averaged phase differences over a plurality of the receiving antennas and carriers;
deriving a frequency correction value based on the summed average; and
compensating the frequency offsets using the frequency correction value derived.

7. The method according to claim 6, further comprising dynamically changing the number of the channel estimates used in the computation of the at least one phase difference.

8. The method according to claim 6, wherein summing the averaged phase differences comprises using different weighting factors for different carriers.

9. The method according to claim 8, wherein a higher weighting factor is used for the averaged phase difference obtained for a carrier whose frequency offset has a lower variance or standard deviation.

10. The method according to claim 5, wherein controlling compensation of the frequency offsets further comprises:
computing a channel estimate for each receiving antenna-carrier-reference symbol combination;
computing, with respect to each receiving antenna-carrier combination, phase differences between the subsequent channel estimates corresponding to all the reference symbols included in the set of reference symbols;
summing, for at least one carrier, the phase differences over a plurality of receiving antennas and the reference symbols in the set of reference symbols to obtain a summed phase difference;
deriving, for the at least one carrier, a frequency correction value based on the summed phase difference;
obtaining a weighted average of the frequency correction values corresponding to the plurality of carriers; and
compensating the frequency offsets using the average frequency correction value obtained.

11. The method according to claim 10, wherein obtaining a weighted average of the frequency correction values comprises using different weighting factors for different carriers.

12. The method according to claim 11, wherein values of the different weighting factors depend on signal-strengths or signal-to-interference ratios of the different carriers.

13. A computer program product stored on a non-transitory computer-readable medium and comprising program code for a computing device in a multi-carrier receiver that is configured to receive signals on a plurality of carriers at respective carrier frequencies, said program code comprising program instructions to configure the computing device to: derive a frequency offset for each carrier frequency; correlate the plurality of frequency offsets corresponding to the plurality of carrier frequencies; and control compensation of the frequency offsets based on a result of the correlation.

14. An apparatus for frequency error compensation in a multi-carrier receiver that is configured to receive signals on a plurality of carriers at respective carrier frequencies, the apparatus comprising:
a derivation unit configured to derive a frequency offset for each carrier frequency;
a correlator configured to correlate the plurality of frequency offsets corresponding to the plurality of carrier frequencies; and
a controller configured to control compensation of the frequency offsets based on a result of the correlation.

15. The apparatus according to claim 14, wherein the derivation unit is further configured to:
derive, based on a set of reference symbols included in the signal received on the respective carrier, a frequency error signal; and
accumulate, for the respective carrier, such frequency error signals with respect to one or more of the sets of the reference symbols, to obtain an accumulated frequency error signal.

16. The apparatus according to claim 15, wherein the correlator is further configured to:
for each carrier, form a group of the accumulated frequency error signals comprising a plurality of the accumulated frequency error signals obtained with respect to a plurality the sets of the reference symbols; and
calculate a correlation coefficient between the groups of the accumulated frequency error signals.

17. The apparatus according to claim 16, further comprising a comparator configured to compare the correlation coefficient with at least one threshold.

18. The apparatus according to claim 17, further comprising a frequency corrector configured to:
compute a channel estimate for each receiving antenna-carrier-reference symbol combination;
compute, with respect to each receiving antenna-carrier combination, at least one phase difference between the channel estimates corresponding to subsequent reference symbols included in the set of reference symbols;

obtain, for each receiving antenna-carrier combination, an average of the at least one phase difference;

sum the averaged phase differences over a plurality of antennas and carriers;

derive a frequency correction value based on the summed average; and compensate the frequency offsets using the frequency correction value derived.

19. The apparatus according to claim 17, further comprising a frequency corrector configured to:

compute a channel estimate for each receiving antenna-carrier-reference symbol combination;

compute, with respect to each receiving antenna-carrier combination, phase differences between the subsequent channel estimates corresponding to all the symbols included in the reference-symbol set;

sum, for at least one carrier, the phase differences over a plurality of receiving antennas and the symbols in the reference-symbol set to obtain a summed phase difference;

derive, for the at least one carrier, a frequency correction value based on the summed phase difference;

obtain a weighted average of the frequency correction values corresponding to the plurality of carriers; and compensate the frequency offsets using the average frequency correction value obtained.

20. A multi-carrier receiver that is configured to receive signals on a plurality of carriers at respective carrier frequencies, said multi-carrier receiver including an apparatus comprising:

a derivation unit configured to derive a frequency offset for each carrier frequency;

a correlator configured to correlate the plurality of frequency offsets corresponding to the plurality of carrier frequencies; and a controller configured to control compensation of the frequency offsets based on a result of the correlation.

21. A user terminal including a multi-carrier receiver that is configured to receive signals on a plurality of carriers at respective carrier frequencies, said user terminal further including an apparatus comprising:

a derivation unit configured to derive a frequency offset for each carrier frequency;

a correlator configured to correlate the plurality of frequency offsets corresponding to the plurality of carrier frequencies; and a controller configured to control compensation of the frequency offsets based on a result of the correlation.

22. A base station including a multi-carrier receiver that is configured to receive signals on a plurality of carriers at respective carrier frequencies, said base station further including an apparatus comprising:

a derivation unit configured to derive a frequency offset for each carrier frequency;

a correlator configured to correlate the plurality of frequency offsets corresponding to the plurality of carrier frequencies; and a controller configured to control compensation of the frequency offsets based on a result of the correlation.

* * * * *

UNITED STATES PATENT AND TRADEMARK OFFICE
CERTIFICATE OF CORRECTION

PATENT NO. : 8,861,657 B2
APPLICATION NO. : 13/695885
DATED : October 14, 2014
INVENTOR(S) : Nilsson et al.

It is certified that error appears in the above-identified patent and that said Letters Patent is hereby corrected as shown below:

In the specification

In Column 4, Line 42, delete "a another" and insert -- another --, therefor.

In Column 5, Line 18, delete "Orcuit" and insert -- Circuit --, therefor.

In Column 5, Line 64, delete "$(f_1+f^2)/2$" and insert -- $(f_1+f_2)/2$ --, therefor.

In Column 8, Line 33, delete "through" and insert -- thorough --, therefor.

In Column 10, Line 58, in Eq. "(15)", delete "$\Delta h_{a,f,c}^{i} = h_{a,f,c}^{i-1} \cdot (h_{a,f,c}^{i})^*$," and insert -- $\Delta h_{a,f,c}^{i} = h_{a,f,c}^{i+1} \cdot (h_{a,f,c}^{i})^*$, -- therefor.

Signed and Sealed this
Third Day of November, 2015

Michelle K. Lee
*Director of the United States Patent and Trademark Office*